US011965422B2

(12) United States Patent
Poick

(10) Patent No.: US 11,965,422 B2
(45) Date of Patent: Apr. 23, 2024

(54) VARIABLE GUIDE VANE ASSEMBLY FOR GAS TURBINE ENGINE

(71) Applicant: Pratt & Whitney Canada Corp., Longueuil (CA)

(72) Inventor: Daniel Poick, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/879,488

(22) Filed: Aug. 2, 2022

(65) Prior Publication Data

US 2024/0044259 A1 Feb. 8, 2024

(51) Int. Cl.
*F01D 17/16* (2006.01)
*F01D 9/04* (2006.01)

(52) U.S. Cl.
CPC ........... *F01D 17/167* (2013.01); *F01D 9/041* (2013.01); *F05D 2240/11* (2013.01); *F05D 2260/36* (2013.01); *F05D 2260/50* (2013.01)

(58) Field of Classification Search
CPC ........ F01D 17/14; F01D 17/16; F01D 17/162; F01D 17/167; F01D 9/00; F01D 9/02; F01D 9/04; F01D 9/041; F01D 9/042; F05D 2240/11; F05D 2240/128; F05D 2260/36; F05D 2260/50
See application file for complete search history.

(56) References Cited

U.S. PATENT DOCUMENTS

| | | | | |
|---|---|---|---|---|
| 4,773,817 A | 9/1988 | Stangalini | | |
| 5,362,202 A * | 11/1994 | Derouet | F04D 29/563 | 415/173.2 |
| 10,495,108 B2 | 12/2019 | Conner | | |
| 2014/0140822 A1* | 5/2014 | Capozzi | F01D 17/162 | 415/160 |
| 2018/0371938 A1* | 12/2018 | Skertic | F01D 17/16 | |
| 2020/0141331 A1* | 5/2020 | Tramontin | F04D 29/563 | |

OTHER PUBLICATIONS

EP Search Report for EP Patent Application No. 23189310.8 dated Jan. 2, 2024.

* cited by examiner

*Primary Examiner* — Elton K Wong
(74) *Attorney, Agent, or Firm* — Getz Balich LLC

(57) ABSTRACT

A variable guide vane assembly for a gas turbine engine stator is provided. The variable guide vane assembly includes a plurality of vanes and a plurality of RT mechanisms. The vanes extend between a shroud and hub. The vanes are circumferentially disposed and spaced apart from one another. Each vane includes inner and outer radial ends, and inner and outer radial posts. Each vane is pivotally mounted to rotate about its rotational axis. Each RT mechanism is in communication with the inner or outer radial post of a respective vane. The RT mechanism includes a pin connected to the vane that is disposed in a ramp slot non-rotational relative to the pivotable vane. The ramp slot extends between first and second lengthwise ends. Rotation of the vane relative to the ramp slot causes the pin to travel within the ramp slot and the vane to translate linearly.

9 Claims, 6 Drawing Sheets

VARIABLE GUIDE VANE ASSEMBLY FOR GAS TURBINE ENGINE

BACKGROUND OF THE INVENTION

1. Technical Field

The present invention relates to gas turbine engines in general, and to variable guide vane assemblies for use in a gas turbine engine in particular.

2. Background Information

In a gas turbine engine, air is pressurized by rotating blades within a compressor, mixed with fuel and then ignited within a combustor for generating hot combustion gases, which flow downstream through a turbine for extracting energy therefrom. Within the compressor of the engine, the air is channeled through circumferential rows of vanes and blades that pressurize the air in stages. Variable guide vanes (VGVs) are sometimes used within compressors and/or turbines, and provide vanes which are rotatable such that an angle of attack they define with the incoming flow may be varied.

Conventional variable vane are prone to leakage at the interfaces between the rotatable vanes and the surrounding static flow assemblies; i.e., between the outer radial edge surface of the vane and the inner circumferential surface of the shroud and between the inner radial edge surface of the vane and the outer radial surface of the hub. Variable vane devices are typically designed to minimize such vane/shroud clearances and vane/hub clearances, while avoiding contact between the vane edge surfaces and the shroud and hub. However, due to the relatively complex geometric relationship between the vane edge surfaces and the annular shroud and hub surfaces, the clearances vary as a function of vane rotational position. Such leakage may lower engine efficiency and create undesirable airflow anomalies.

What is needed is a variable guide vane system that is an improvement over the currently available variable guide vanes systems.

SUMMARY

According to an aspect of the present disclosure, a variable guide vane assembly for a gas turbine engine stator having a shroud and a hub is provided. The shroud and hub extend circumferentially. The shroud is disposed radially outside of the hub, and the shroud and hub collectively form an annular gas path therebetween. The variable guide vane assembly includes a plurality of vanes and a plurality of rotational—translational mechanisms (RT mechanisms). The plurality of vanes extend between the shroud and the hub, and the vanes are circumferentially disposed and spaced apart from one another. Each vane includes an inner radial end disposed adjacent the hub, an outer radial end disposed adjacent the shroud, an inner radial post, an outer radial post, and a rotational axis extending through the inner radial post and the outer radial post. Each vane is pivotally mounted to rotate about its rotational axis. Each RT mechanism is in communication with the inner radial post or the outer radial post of a respective vane. The RT mechanism includes a pin connected to the vane. The pin is disposed in a ramp slot non-rotational relative to the pivotable vane. The ramp slot extends circumferentially between first and second lengthwise ends. The ramp slot is configured such that rotation of the vane relative to the ramp slot causes the pin to travel within the ramp slot and the vane to translate linearly between the shroud and the hub.

In any of the aspects or embodiments described above and herein, at least one of the plurality of RT mechanisms may include a collar non-rotational relative to the pivotable vane. The collar has an inner bore configured to receive the inner radial post or the outer radial post of the respective vane. The ramp slot is disposed in the collar.

In any of the aspects or embodiments described above and herein, the collar may include an outer radial surface disposed radially outside of the inner bore and the ramp slot may extend between the inner bore and the outer radial surface. The pin may be attached to the inner radial post or the outer radial post of the respective vane and is received within the ramp slot.

In any of the aspects or embodiments described above and herein, the pin may extend radially outwardly from the inner radial post or the outer radial post of the respective vane in a direction substantially perpendicular to the rotational axis of the vane.

In any of the aspects or embodiments described above and herein, the outer radial post may be received within the inner bore of the collar and the collar may be configured for attachment to the shroud.

In any of the aspects or embodiments described above and herein, the outer radial post may be received within the inner bore of the collar and the collar may be integral with the shroud.

In any of the aspects or embodiments described above and herein, the inner radial post may be received within the inner bore of the collar and the collar may be configured for attachment to the hub.

In any of the aspects or embodiments described above and herein, the inner radial post may be received within the inner bore of the collar and the collar may be integral with the hub.

In any of the aspects or embodiments described above and herein, the plurality of RT mechanisms may include a plurality of first RT mechanisms and a plurality of second RT mechanisms. For each vane: a first RT mechanism may include a first collar non-rotational relative to the pivotable vane, the first collar having a first inner bore configured to receive the outer radial post, and wherein a first ramp slot is disposed in the first collar and a first pin is attached to the outer radial post and is received within the first ramp slot; and a second RT mechanism may include a second collar non-rotational relative to the pivotable vane, the second collar having a second inner bore configured to receive the inner radial post, wherein a second ramp slot is disposed in the second collar and a second pin is attached to the inner radial post and is received within the second ramp slot.

In any of the aspects or embodiments described above and herein, the ramp slot extending circumferentially between the first and second lengthwise ends has a non-constant slope.

In any of the aspects or embodiments described above and herein, at least one of the plurality of RT mechanisms may include a ramp spacer non-rotational relative to the pivotable vane, the ramp spacer having an inner bore configured to receive the inner radial post or the outer radial post of the respective said vane. The ramp slot is disposed in the ramp spacer.

In any of the aspects or embodiments described above and herein, the inner bore of the ramp spacer may extend between first and second axial end surfaces, and the ramp slot may be disposed in the first axial end surface. The ramp slot may have a first depth at the first lengthwise end and a second depth at the second lengthwise end, wherein the second ramp slot depth may be greater than the first ramp slot depth.

In any of the aspects or embodiments described above and herein, the pin may be attached to the inner radial end or the outer radial end of the respective vane and may be received within the ramp slot.

In any of the aspects or embodiments described above and herein, the pin may extend outwardly from the inner radial end or the outer radial end of the respective vane in a direction that is substantially parallel to the rotational axis of the respective vane.

In any of the aspects or embodiments described above and herein, the outer radial post may be received within the inner bore of the ramp spacer and the ramp spacer may be configured for attachment to the shroud.

In any of the aspects or embodiments described above and herein, the outer radial post may be received within the inner bore of the ramp spacer and the ramp spacer may be integral with the shroud.

In any of the aspects or embodiments described above and herein, the inner radial post may be received within the inner bore of the ramp spacer and the ramp spacer may be configured for attachment to the hub.

In any of the aspects or embodiments described above and herein, the inner radial post may be received within the inner bore of the ramp spacer and the ramp spacer may be integral with the hub.

In any of the aspects or embodiments described above and herein, the plurality of RT mechanisms may include a plurality of first RT mechanisms and a plurality of second RT mechanisms. For each vane: a first RT mechanism may include a first ramp spacer non-rotational relative to the pivotable vane, the first ramp spacer having a first inner bore configured to receive the outer radial post, wherein a first ramp slot is disposed in the first ramp collar and a first pin is attached to the outer radial end and is received within the first said ramp slot; and a second RT mechanism may include a second ramp spacer non-rotational relative to the pivotable vane, the second ramp spacer having a second inner bore configured to receive the inner radial post, wherein a second ramp slot is disposed in the second ramp spacer and a second pin is attached to the inner radial end and is received within the second said ramp slot.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
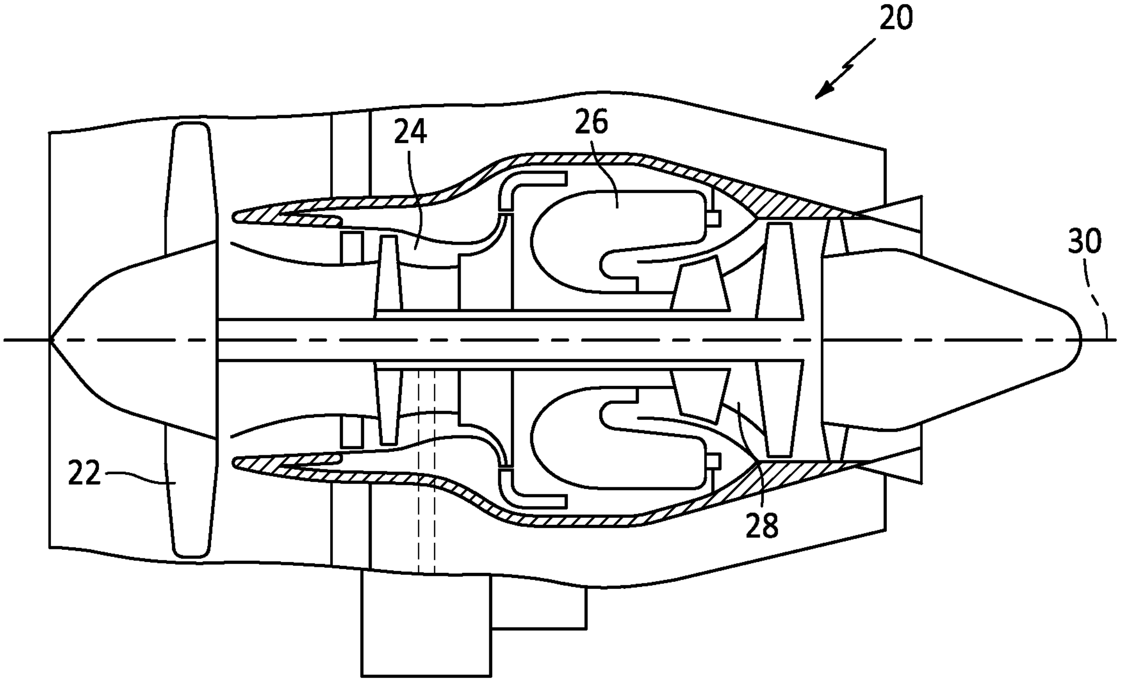
FIG. 1 is a diagrammatic sectional view of a gas turbine engine.

FIG. 1 illustrates a gas turbine engine 20 of a type preferably provided for use in subsonic flight, and in driving engagement with a rotatable load, which is depicted as a propeller. The gas turbine engine 20 has in serial flow communication a fan 22 and a compressor section 24 for pressurizing the air, a combustor 26 in which the compressed air is mixed with fuel and ignited to generate an annular stream of hot combustion gases, and a turbine section 28 for extracting energy from the combustion gases. It should be noted that the terms "upstream" and "downstream" used herein refer to the direction of an air/gas flow passing through an annular gas path of the gas turbine engine 20. It should also be noted that the terms "radial" and "circumferential" are used herein with respect to a central axis 30 of the gas turbine engine 20. The central axis 30 of the gas turbine engine is typically also the central axis of the gas path through the engine; e.g., an annular gas path is typically symmetrical about the engine central axis 30. To facilitate the description herein, the present disclosure will be described in terms of a gas path central axis coincident with an engine central axis 30, but the present disclosure is not limited to this embodiment. The present disclosure may be used within conventional through-flow engines, or reverse flow engines, and gas turbine engine types such as turbofan engines, turboprop engines, turboshaft engines, and the like.

The compressor section 24 and the turbine section 28 each typically include a plurality of stages, each stage including a stator and a rotor. The rotors are rotatable relative to the stators about the central axis 30. Each of the stators includes a plurality of vanes circumferentially distributed about the central axis 30 and extending into the gas path. Each of the rotors includes a plurality of blades circumferentially distributed around the central axis 30 and extending into the gas path, the rotors and thus the blades thereof rotating about the central axis 30. At least one of the stators may be configured as a variable guide vane assembly as will be described.

Figure 2:
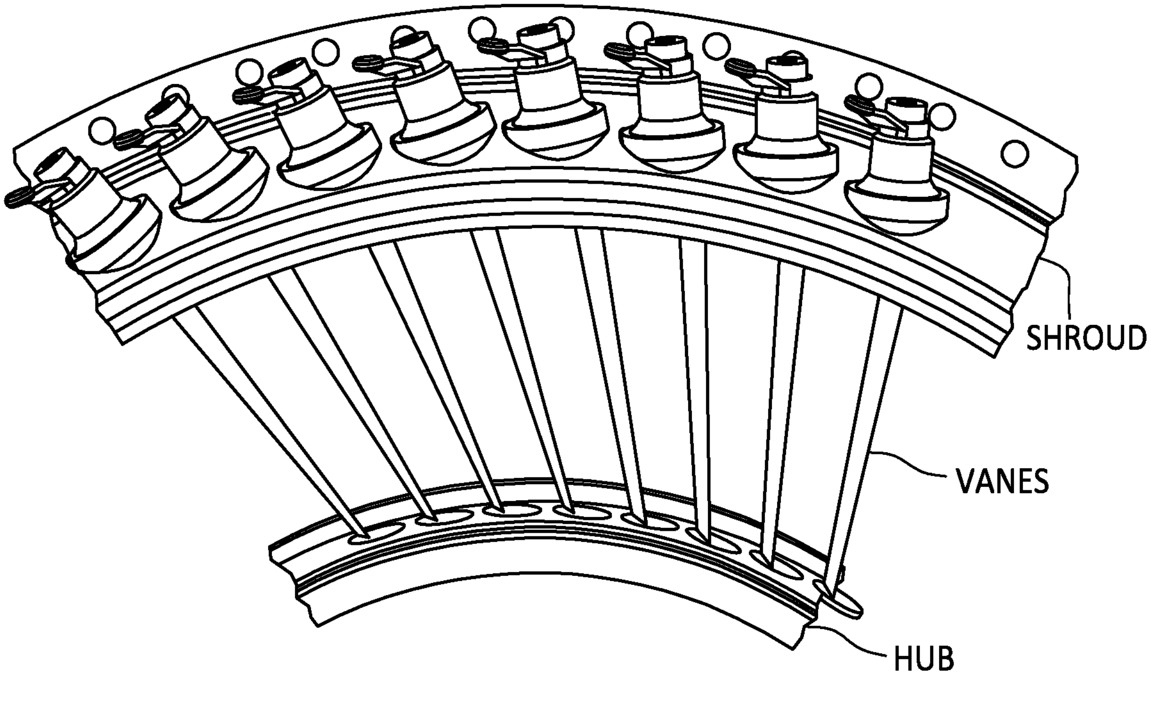
FIG. 2 is a diagrammatic partial view of a variable guide vane assembly.

Stators configured as a variable guide vane (VGV) assembly are known to those of skill in the art. FIG. 2 illustrates a partial view of a VGV assembly 32 configured as a variable geometry inlet guide vane assembly. A VGV assembly 32 may be used in the compressor section 24 of an engine 20, or in a turbine section 28 of an engine 20, including just upstream (e.g., an inlet guide vane assembly) or downstream of the same. A VGV assembly 32 includes a plurality of vanes circumferentially distributed about the central axis 30 and extending radially between the inner casing (or "hub") and the outer casing (or "shroud"). As will be described in greater detail herein, each vane is mounted to permit pivoting of the respective vane about a pivot axis. A drive mechanism (not shown) is in communication with each vane in the VGV assembly 32 to cause each respective vane in the VGV assembly 32 to rotate about its pivot axis, with the plurality of vanes in the VGV assembly 32 rotating in unison. Rotation of the vanes changes the angle of attack of each vane relative to the direction of the air flow encountering the VGV assembly 32. Different engine operational modes benefit from different angles of attack. The present disclosure may be used with a variety of VGV assembly 32 rotational drive mechanisms (i.e., the structure used to rotate the vanes about their pivot axes) and is not limited to any particular VGV assembly rotational drive mechanism. Non-limiting examples of VGV assembly rotational drive mechanisms are described in U.S. Pat. Nos. 11,359,509; 11,372,380; 11,346,241; 11,092,167; and 11,092,032, all of which are hereby incorporated by reference.

Figure 3:
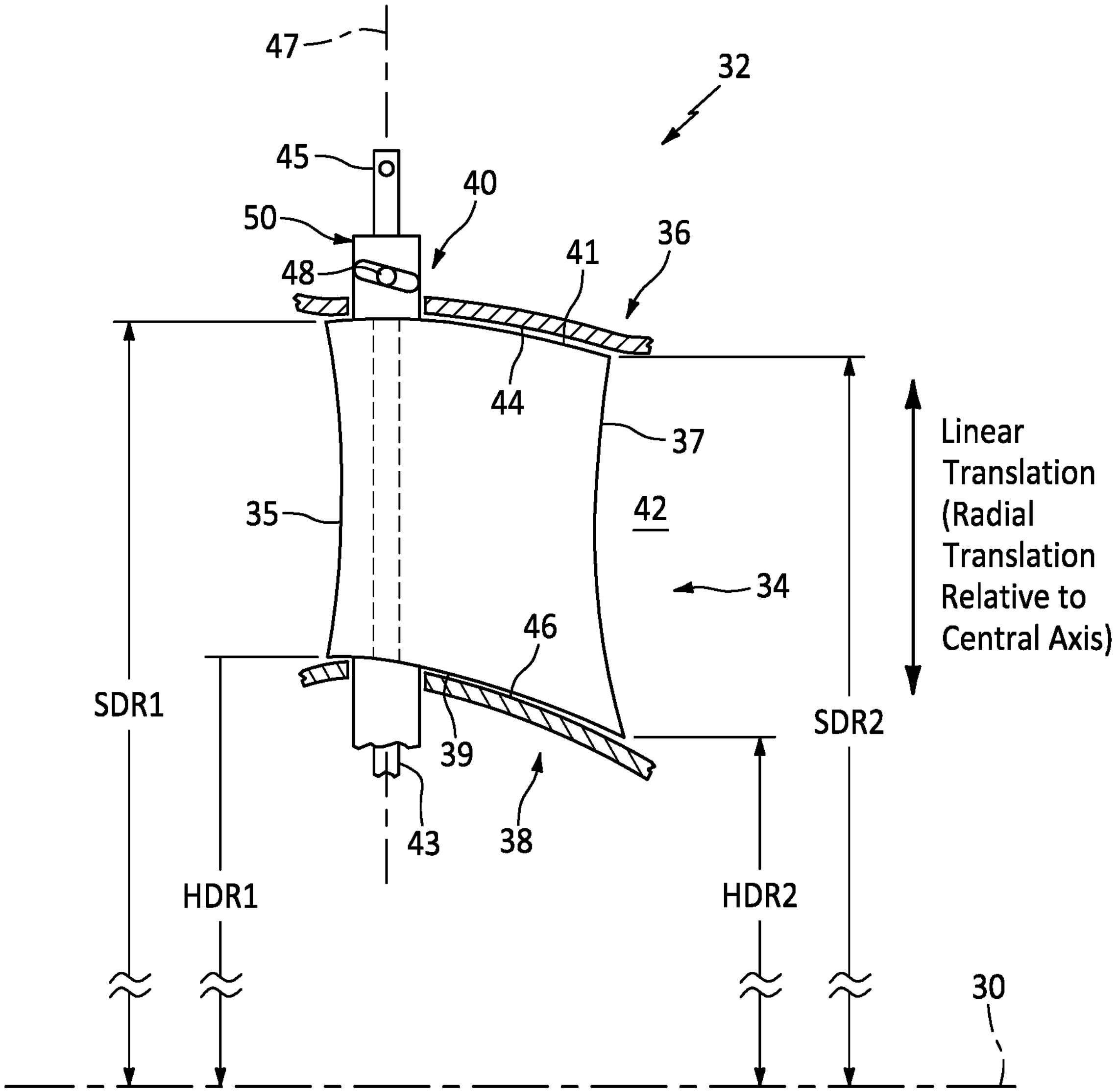
FIG. 3 is a diagrammatic view of a present disclosure variable guide vane assembly embodiment.

Referring to FIG. 3, the present disclosure includes a VGV assembly 32 that includes a plurality of vanes 34 extending between a shroud structure 36 and a hub structure 38 and a plurality of RT mechanisms 40 (described below). The shroud structure 36 is disposed radially outside of the vanes 34 and the hub structure 38 is disposed radially inside of the vanes. The gas path 42 through the VGV assembly 32 is an annular configuration defined by the inner radial surface 44 of the shroud structure 36 and the outer radial surface 46 of the hub structure 38. The vanes extend radially between the hub structure 38 and the shroud structure 36. The vane assemblies are disposed around the circumference of the hub structure 38, spaced apart from one another; e.g., the vanes may be uniformly spaced around the circumference of the annular gas path.

Each vane 34 has a leading edge 35, a trailing edge 37, an inner radial end 39, an outer radial end 41, an inner radial post 43 extending outwardly from the inner radial end 39, an outer radial post 45 extending outwardly from the outer radial end 41, and a vane rotational axis 47 that extends through the inner and outer radial posts 43, 45. When the VGV assembly 32 is disposed within the engine 20, the vane inner radial end 39 is disposed adjacent the hub 38 and the vane outer radial end 41 is disposed adjacent the shroud 36. The vane leading edge 35 is disposed forward of the vane trailing edge 37.

As stated above, the annual gas path 42 through the VGV assembly 32 is defined by the inner radial surface 44 of the shroud structure 36 and the outer radial surface 46 of the hub structure 38. The shroud structure 36 and the hub structure 38 extend circumferentially. Hence, the inner radial surface 44 of the shroud structure 36 has a circumferential curvature at a radius (extending between the central axis 30 and the inner radial surface 44 of the shroud structure 36) and the outer radial surface 46 of the hub structure 38 has a circumferential curvature at a radius (extending between the central axis 30 and the outer radial surface 46 of the hub structure 38).

The inner radial surface 44 of the shroud structure 36 extends an axial distance radially outside of the VGV assembly 32. The inner radial surface 44 of the shroud structure 36 at the axial inlet to the VGV assembly 32 is disposed a radial distance "SRD1" from the central axis 30. The inner radial surface 44 of the shroud structure 36 at the axial exit to the VGV assembly 32 is disposed a radial distance "SRD2" from the central axis 30. In many instances, the inner radial surface 44 of the shroud structure 36 is contoured such that the radial distance at the VGV inlet (SRD1) is different from the radial distance at the VGV exit (SRD2); e.g., the inner radial surface 44 of the shroud structure 36 between the VGV inlet and the VGV exit may be arcuately shaped for aerodynamic purposes. In similar fashion, the outer radial surface 46 of the hub structure 38 extends an axial distance radially inside the VGV assembly 32. The outer radial surface 46 of the hub structure 38 at the axial inlet to the VGV assembly 32 is disposed a radial distance "HRD1" from the central axis 30. The outer radial surface 46 of the hub structure 38 at the axial exit to the VGV assembly 32 is disposed a radial distance "HRD2" from the central axis 30. In many instances, the outer radial surface 46 of the hub structure 38 is contoured such that the radial distance at the VGV inlet (HRD1) is different from the radial distance at the VGV exit (HRD2); e.g., the outer radial surface 46 of the hub structure 38 between the VGV inlet and the VGV exit may be arcuately shaped for aerodynamic purposes. FIG. 3 illustrates an arcuately shaped shroud structure inner radial surface 44 between the VGV inlet and the VGV exit, and an arcuately shaped hub structure outer radial surface 46 between the VGV inlet and the VGV exit. The geometric configuration of the shroud structure 36 between the VGV inlet and exit may mirror the geometric configuration of the hub structure 38 between the VGV inlet and exit, or the two surfaces may not mirror one another. FIG. 3 diagrammatically illustrates a hub structure 38 and a shroud structure 36 that do not mirror one another between the VGV inlet and exit. The present disclosure is not limited to any particular hub structure 38 geometric configuration between the VGV inlet and exit or any particular shroud structure 36 geometric configuration between the VGV inlet and exit.

Figure 4:
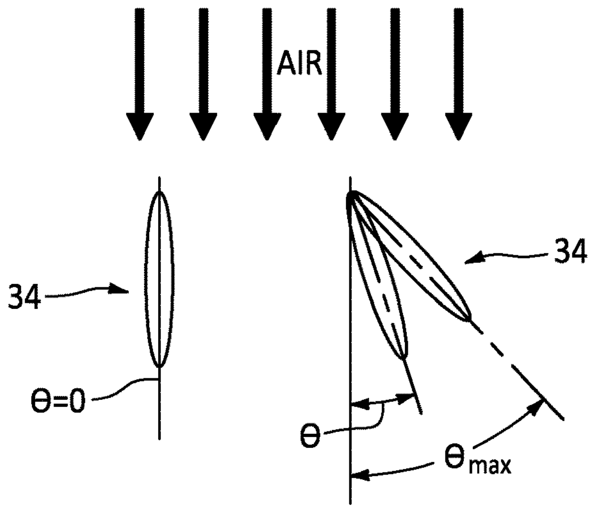
FIG. 4 is a diagram illustrating vane angular orientations relative to airflow within a gas path.

Referring to vane angular orientation diagram shown in FIG. 4, VGV assemblies are designed to rotate the vanes 34 some angular amount between a first rotational position (e.g., where the chord of each vane 34 is aligned with the air flow through the VGV assembly 32; theta=0; shown by the vane on the left), and a second rotational position (e.g., a rotated position wherein the chord of each vane 34 is disposed at a maximum angle relative to the air flow through the VGV assembly 32 (theta=max angle), and a plurality of rotational positions therebetween (0<theta<max angle). The amount of vane 34 angular rotation often depends on the VGV assembly 32 application. A typical vane 34 angular rotation is twenty to seventy-five degrees (20-75°). The present disclosure is not limited to any particular vane 34 angular rotation range. The particular angle that the vanes 34 within the VGV assembly 32 are disposed relative to airflow direction during the operation of the engine 20 may be defined by the then operational constraints; e.g., the vane angle theta preferred for a maximum power setting may be different than the vane angle theta preferred for a cruise power setting, etc. An advantage of a VGV assembly 32, as opposed to a vane 34 disposed at a fixed angle, is that the vane angle can be tailored to the operational needs.

Rotation of the vanes 34 between first and second rotational positions must consider the differences in the shroud structure inner radial surface 44 radius between the VGV inlet and the VGV exit (i.e., between SRD1 and SRD2—see FIG. 3), and the differences in the hub structure outer radial surface 46 radius between the VGV inlet and the VGV exit (i.e., between HRD1 and HRD2—see FIG. 3). Failure to consider these inner and outer gas path surfaces may result in contact between the vane inner radial end 39 and the hub 38, or contact between the vane outer radial end 41 and the shroud 36, or both. Some existing VGV assemblies accommodate the aforesaid shroud and hub geometries by increasing the clearance between the vane inner radial end 39 and the hub 38, or between the vane outer radial end 41 and the shroud 36, or both. As stated in the Background of the Invention, however, increasing the aforesaid clearances can result in undesirable leakage that may lower engine efficiency and create undesirable airflow anomalies.

The present disclosure provides an improvement that considers the contour of the shroud structure inner radial surface 44, and the contour of the hub outer radial surface 46 radius between the VGV inlet and the VGV exit by "linearly" translating the vane 34 as the vane 34 is rotated. The term "linear translation" as used herein refers to axial translation between the vane inner or outer radial post 43, 45 and a mechanism for rotational and linear translation of the vane 34 ("RT mechanism 40") which equates to radial translation of the vane 34 within the VGV assembly 32 relative to the central axis 30. In this manner, the clearance gap between the vane inner radial end 39 and the hub 38 and the clearance gap between the vane outer radial end 41 and the shroud 36 can be maintained to decrease the aforesaid undesirable leakage. In addition, the present disclosure RT mechanism 40 facilitates rotational movement of the vane 34, permits customized linear translation, and is cost effective to manufacture.

Figure 5:
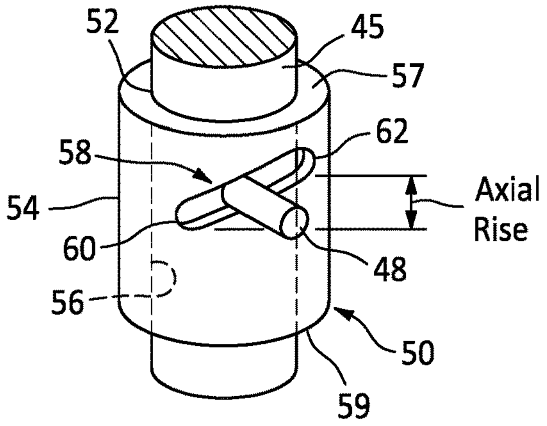
FIG. 5 is a diagrammatic view of an RT mechanism embodiment of the present disclosure.
Figure 6:
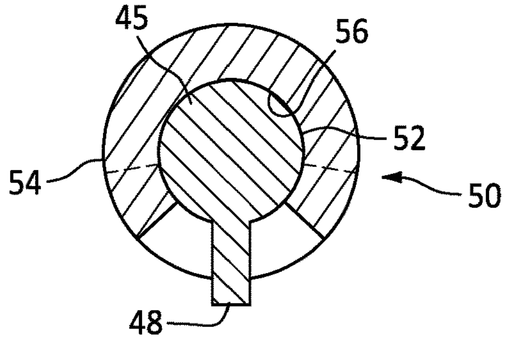
FIG. 6 is a sectional view of the RT mechanism embodiment shown in FIG. 5 along cut line 6-6.

Referring to FIGS. 3, 5, and 6, in a first embodiment the present disclosure includes an RT mechanism 40 that includes a vane 34 with an outer radial post 45 having at least one pin 48 that extends perpendicularly outwardly from the outer radial post 45 (i.e., perpendicular to the rotational axis 47 of the vane 34), and a collar 50 having an inner bore 52 configured to receive the outer radial post 45. The collar 50 includes an outer radial surface 54 and an inner bore surface 56, the latter defining the inner bore 52. The outer radial surface 54 and the inner bore surface 56 extend axially between a first axial end 57 and a second axial end 59. In some embodiments, at least one ramp slot 58 may extend from the inner bore surface 56 through to the outer radial surface 54 of the collar 50. The ramp slot 58 is configured to receive the pin 48 and has a length that extends a distance between a ramp slot first lengthwise end 60 and a second lengthwise end 62. The length of the ramp slot 58 extends circumferentially and is disposed at a skewed angle that produces an axial rise; i.e., the first lengthwise end 60 of the ramp slot 58 is disposed at a collar axial position different from that of the second lengthwise end 62. The axial distance between the first lengthwise end 60 of the ramp slot 58 and the second lengthwise end 62 is labeled in FIG. 5 as the axial rise. Phrased differently, the ramp slot 58 may be described as extending between the first and second lengthwise ends 60, 62 in a direction of travel that includes a circumferential component and an axial component. The circumferential component relates to the amount of vane 34 travel possible and the axial component relates to the amount of relative axial travel between the outer radial post 45 and the collar 50 that is possible during the aforesaid rotation. The outer radial post 45 is slidably received within the collar inner bore 52. The pin 48 extends through the ramp slot 58 and constrains relative movement between the collar 50 and the outer radial post 45. More specifically, the pin 48 extending into or through the ramp slot 58 causes relative axial translation between the collar 50 and the outer radial post (and therefore radial translation of the vane 34 relative to the central axis 30) during vane 34 rotation. In some embodiments, the collar 50 may be positionally fixed so that rotation of the vane 34 causes the vane 34 to axially translate within the collar inner bore 52 as the vane 34 is rotated (which equates to radial translation of the vane 34 relative to the central axis 30). In alternative embodiments, the pin 48/ramp slot 58 may be disposed vice versa; i.e., the ramp slot may be disposed in the outer radial post 45 and the pin disposed in the collar 50. As described above, this RT mechanism 40 embodiment may have more than one pin 48 and ramp slot 58 pair; e.g. two pairs disposed 180 degrees from one another.

Figure 7:
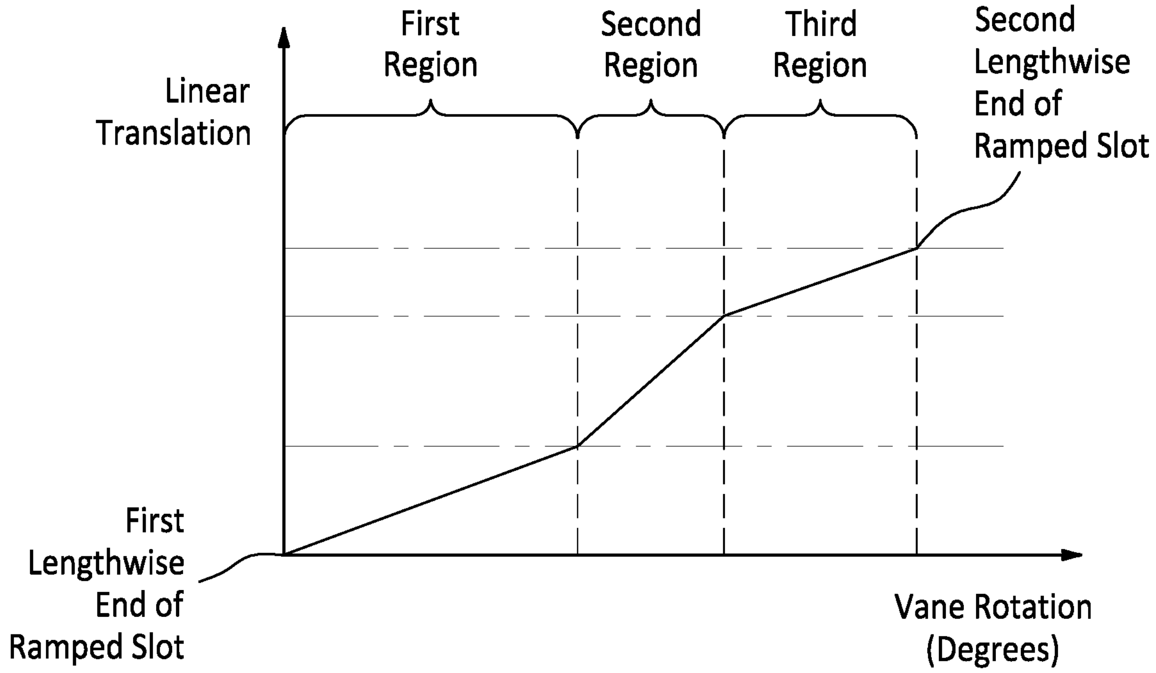
FIG. 7 is a graph of vane linear translation versus vane rotation.

The axial rise of the ramp slot 58 (i.e., the difference in collar 50 axial position between the first and second lengthwise ends of the ramp slot 58) is chosen to cause the rotating vane 34 to track with the hub outer radial surface 46 and the shroud inner radial surface 44 and thereby avoid clearance gaps that would otherwise potentially cause undesirable leakage. The pin 48/ramp slot 58 is understood to provide significant utility. For example, the amount of surface contact between the pin 48 and ramp slot 58 is substantially less that would be the case if two opposing ramp surfaces extending for most of the circumference were in contact. The decreased amount of contact surface is understood to decrease contact friction and therefore facilitate rotational movement. In addition, the pin 48/ramp slot 58 embodiment of the RT mechanism 40 facilitates embodiments wherein it is desirable to linearly translate the vane 34 (during rotation) in a manner other than a constant slope. In some embodiments it may be desirable to include vane 34 linear translation along a constant slope or a non-constant slope. Examples of a non-constant slope include an arcuate path that includes multiple radii, or a path that includes a plurality of slopes; i.e., greater slope for portions of the vane rotation and lesser slope for other portions of the vane rotation. The graph shown in FIG. 7 diagrammatically shows the vane 34 rotation between the first and second lengthwise ends of the ramp slot 58 in a first region, a second region, and a third region. The linear translation of the vane 34 in the first region may be along a first slope (where slope=linear translation/rotational degrees), the linear translation of the vane 34 in the second region may be along a second slope, and the linear translation of the vane 34 in the third region may be along a third slope. In the example shown in FIG. 7, the first and third slopes are substantially equal but different than the second slope. In this manner, the linear translation of the vane 34 may be customized to produce desirable clearance gaps for the entirety of the vane 34 rotation. The ability of the RT mechanism 40 to translate the vane 34 linearly in a defined manner that tracks with the hub 38 and shroud 36 may enable hub 38 and/or shroud 36 contours (aerodynamically enhanced) otherwise unfeasible. The ramp slot 58 configuration diagrammatically shown in FIG. 7 is provided for illustrative purposes and the present disclosure is not limited thereto.

The above RT mechanism 40 embodiment is described in terms of a pin 48 extending outwardly from a vane outer radial post 45 (e.g., perpendicular to the rotational axis of the vane) and a collar 50 in communication with the vane outer radial post 45. Alternatively, the RT mechanism 40 may be disposed at the inner radial post 43; i.e., a pin 48 extending outwardly from a vane inner radial post 43 and a collar 50 in communication with the vane inner radial post 43. The present disclosure contemplates that the pin 48 may extend through the entire collar 50 wall or less than the entire collar 50 wall. Still further, some embodiments may include a first RT mechanism 40 as described above disposed at the outer radial post 45 and a second RT mechanism 40 as described above at the inner radial post 43 working in concert with one another.

The collar 50 is described above as being static or non-rotational relative to the vane 34. The collar 50 may be independent of the shroud 36 or the hub 38, supported by the shroud 36 or hub 38 or by other structure, or the collar 50 may be integral with the shroud 36 or hub 38.

Referring to FIGS. 8-11, another RT mechanism 40 embodiment includes at least one pin 148 that extends outwardly from the vane 34 (e.g., at the outer radial end 41) adjacent to and substantially parallel with the outer radial post 45 (i.e., substantially parallel to the rotational axis 47 of the vane), and a ramp spacer 64. The ramp spacer 64 includes an outer radial surface 66, an inner bore surface 68, a first axial end surface 70, and a second axial end surface 72. The inner bore surface 68 defines the inner bore 74 and the inner bore 74 is configured to slidably receive the outer radial post 45 (or inner radial post).

The ramp spacer 64 is static or non-rotational relative to the vane 34. The ramp spacer 64 may be independent of the shroud 36 or the hub 38, supported by the shroud 36 or hub 38 or by other structure, or the ramp spacer 64 may be integral with the shroud 36 or hub 38.

Figure 10:
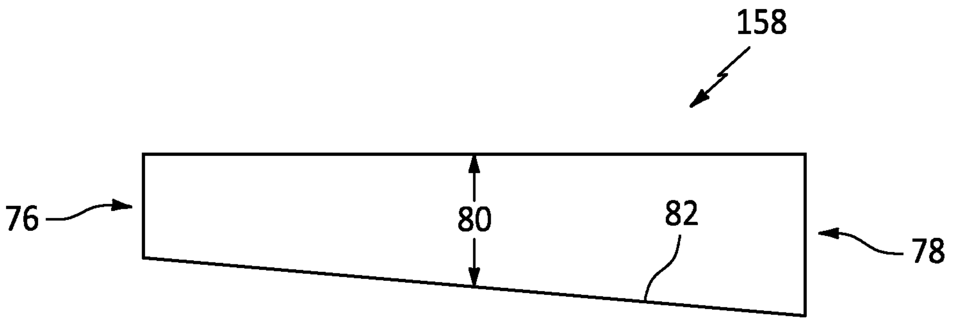
FIG. 10 is a diagrammatic representation of a ramp slot embodiment.

In some embodiments, the ramp spacer 64 includes at least one ramp slot 158 disposed in the first axial end surface 70 of the ramp spacer 64. The ramp slot 158 extends a circumferential distance around the inner bore 74, extending from a first lengthwise end 76 to a second lengthwise end 78. The ramp slot 158 includes a width configured to receive the pin 148, a slot depth 80, and a slot base surface 82 disposed at the slot depth 80. In some embodiments, the slot depth 80 disposed at the first lengthwise end is less than the slot depth 80 at the second lengthwise end. The ramp slot 158 diagrammatically shown in FIG. 10 illustrates a slot depth 80 that linearly changes (i.e., constant slope) from the first lengthwise end 76 to the second lengthwise end 78. As will be detailed below, the present disclosure is not limited to a ramp slot 158 having a depth 80 that changes linearly. When assembled, the pin 148 is received within the ramp slot 158 in contact with the slot base surface 82. Rotation of the vane 34 (and attached pin 148) relative to the positionally fixed ramp spacer 64 causes translation of the vane 34 toward or away from the ramp spacer 64 (and therefore radial translation of the vane 34 relative to the central axis 30) as the pin 148 in contact with the slot base surface 82 translates along the varying depth ramp slot 158. This RT mechanism 40 embodiment may have more than one pin 148 and ramp slot 158 pair; e.g. two pairs disposed 180 degrees from one another.

Figure 11:
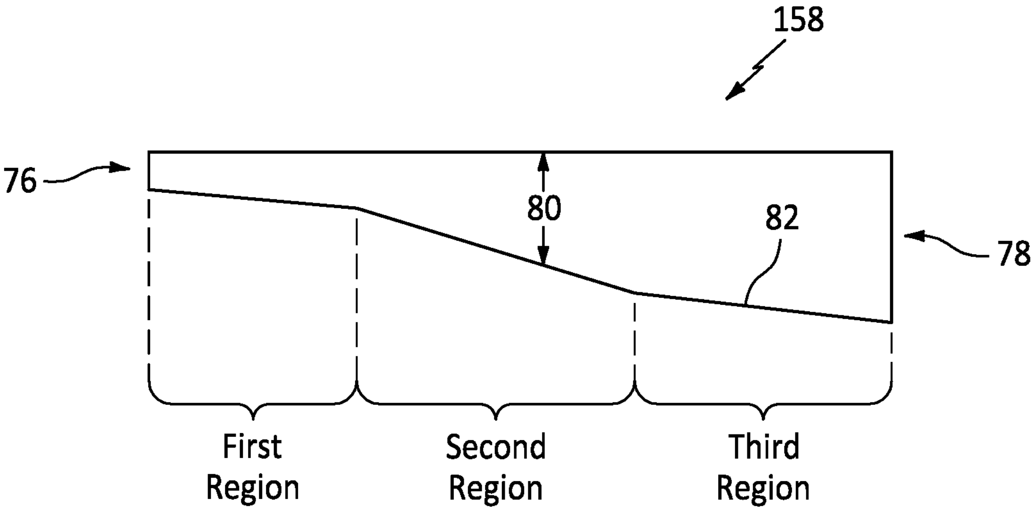
FIG. 11 is a diagrammatic representation of a ramp slot embodiment.

The varying depth 80 of the ramp slot 158 (i.e., the ramp slot depth 80 difference between the first and second lengthwise ends 76, 78 of the ramp slot 158) is chosen to cause the rotating vane 34 to track with the hub outer radial surface 46 and the shroud inner radial surface 44 and thereby avoid clearance gaps that would otherwise potentially cause undesirable leakage. The pin 148/ramp slot 158 is understood to provide significant utility. For example, the amount of surface contact between the pin 148 and the slot base surface 82 is substantially less that would be the case if two opposing ramp surfaces extending for most of the circumference were in contact. The decreased amount of contact surface is understood to decrease contact friction and therefor facilitate rotational movement. In addition, the pin 148/ramp slot 158 embodiment of the RT mechanism 40 facilitates embodiments wherein it is desirable to linearly translate the vane 34 (during rotation) in a manner other than a linear slope. As described above in regard to the embodiment shown in FIG. 7, it may be desirable to include vane 34 linear translation along a constant slope or a non-constant slope. Examples of a non-constant slope include an arcuate path that includes multiple radii, or a path that includes a plurality of slopes; i.e., greater slope for portions of the vane 34 rotation and lesser slope for other portions of the vane 34 rotation. The ramp slot 158 diagrammatically shown in FIG. 11 illustrates a slot depth 80 that having a first, second, and third ramp slot regions. The linear translation of the vane 34 in the first region may be along a first slope (where slope=linear translation/rotational distance), the linear translation of the vane 34 in the second region may be along a second slope, and the linear translation of the vane 34 in the third region may be along a third slope. In the example shown in FIG. 11, the first and third slopes are substantially equal but different than the second slope. In this manner, the linear translation of the vane 34 may be customized to produce desirable clearance gaps for the entirety of the vane 34 rotation. The ability of the RT mechanism 40 to translate the vane 34 linearly in a defined manner that tracks with the hub 38 and shroud 36 may enable hub 38 and/or shroud 36 contours (aerodynamically enhanced) otherwise unfeasible. The ramp slot 158 configurations shown in FIGS. 10 and 11 are provided for illustrative purposes and the present disclosure is not limited thereto.

Figure 8:
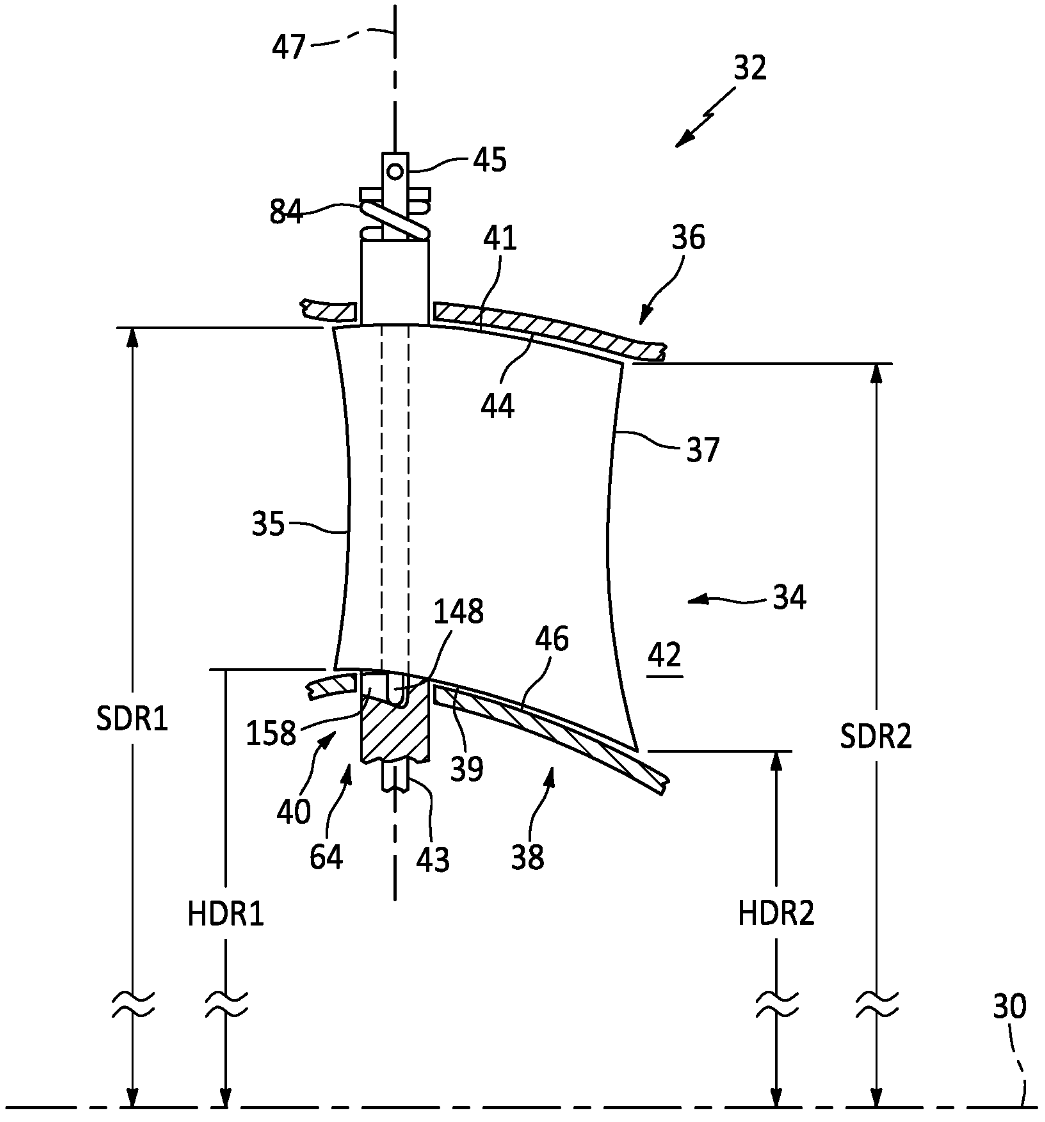
FIG. 8 is a diagrammatic view of a present disclosure variable guide vane assembly embodiment.
Figure 9:
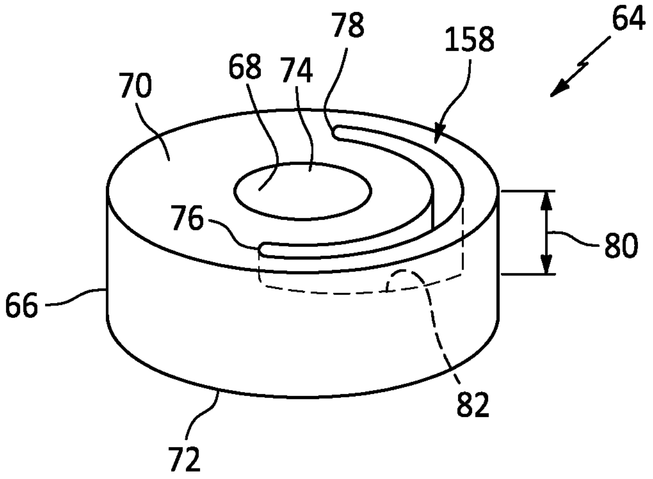
FIG. 9 is a diagrammatic view of a ramp spacer.

In some instances, the RT mechanism 40 embodiment like that shown in FIG. 8 may include a biasing member 84 that, when the VGV assembly 32 is assembled, applies a biasing force against the vane 34 to facilitate maintaining contact between the pin 148 and the slot base surface 82 and deters undesired vibrational or loose movement of vane 34 relative to the ramp spacer 64. The biasing member 84 may be configured such that compression of the biasing member 84 is resisted consequently producing the biasing force that biases the pin 148 into contact with the slot base surface 82. The biasing member 84 may be configured in a variety of different ways. For example, the biasing member 84 may be a wave spring, a coil spring, a machined spring, a Belleville washer, an elastomeric member, or the like.

The above RT mechanism 40 embodiment is described in terms of a pin 148 extending outwardly from the vane 34 (e.g., out from the inner radial end 39) adjacent the vane outer radial post 45 (e.g., substantially parallel to the rotational axis 47 of the vane 34) and a ramp spacer 64 in communication with the vane outer radial post 45 and the pin 148. Alternatively, the RT mechanism 40 may be disposed at the inner radial post 43; i.e., a pin 148 extending outwardly from the vane 34 adjacent the inner radial post 43 and a ramp spacer 64 in communication with the vane inner radial post 43 and the pin 148 extending outwardly from the vane 34. Still further, some embodiments may include a first RT mechanism 40 as described above disposed at the outer radial post 45 and a second RT mechanism 40 as described above at the inner radial post 43 working in concert with one another.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A variable guide vane assembly for a gas turbine engine stator having a shroud and a hub, the shroud and hub extending circumferentially, the shroud disposed radially outside of the hub, the shroud and hub collectively forming an annular gas path therebetween, the variable guide vane assembly comprising:

a plurality of vanes extending between the shroud and the hub, and the vanes are circumferentially disposed and spaced apart from one another, wherein each vane includes:

an inner radial end disposed adjacent the hub;

an outer radial end disposed adjacent the shroud;

an inner radial post;

an outer radial post; and a rotational axis extending through the inner radial post and the outer radial post;

wherein each vane is pivotally mounted to rotate about its rotational axis; and a plurality of rotational—translational mechanisms (RT mechanism), each respective RT mechanism in communication with the inner radial post or the outer radial post of a respective said vane, the RT mechanism including a pin connected to the vane and disposed in a ramp slot that extends circumferentially between a first lengthwise end and a second lengthwise end, and the RT mechanism is configured such that the ramp slot remains static relative to the vane during rotation of the vane, and the rotation of the vane relative to the ramp slot causes the pin to travel within the ramp slot and the vane to translate linearly between the shroud and the hub;

wherein at least one of the plurality of RT mechanisms includes a collar that remains static relative to the vane during rotation of the vane, the collar having an inner bore and the ramp slot is disposed in the collar; and wherein the inner radial post is received within the inner bore of the collar and the collar is in communication with the hub.

2. The variable guide vane assembly of claim 1, wherein the collar includes an outer radial surface disposed radially outside of the inner bore and the ramp slot extends between the inner bore and the outer radial surface, and the pin is attached to the inner radial post or the outer radial post of the respective said vane and is received within the ramp slot.

3. The variable guide vane assembly of claim 2, wherein the pin extends radially outwardly from the inner radial post in a direction substantially perpendicular to the rotational axis of the vane.

4. The variable guide vane assembly of claim 1, wherein the collar is configured for attachment to the hub.

5. The variable guide vane assembly of claim 1, wherein the collar is integral with the hub.

6. The variable guide vane assembly of claim 1, wherein the plurality of RT mechanisms include a plurality of first RT mechanisms and a plurality of second RT mechanisms, and wherein for each said vane:

a said first RT mechanism of the plurality of first RT mechanisms includes a first collar that remains static relative to the vane during rotation of the vane, the first collar having a first inner bore configured to receive the outer radial post, wherein a first said ramp slot is disposed in the first collar and a first said pin is attached to the outer radial post and is received within the first ramp slot; and a said second RT mechanism of the plurality of second RT mechanisms includes a second collar that remains static relative to the vane during rotation of the vane, the second collar having a second inner bore configured to receive the inner radial post, wherein a second said ramp slot is disposed in the second collar and a second said pin is attached to the inner radial post and is received within the second ramp slot.

7. The variable guide vane assembly of claim 1, wherein the ramp slot extending circumferentially between the first lengthwise end and the second lengthwise end has a non-constant slope.

8. A variable guide vane assembly for a gas turbine engine stator having a shroud and a hub, the shroud and hub extending circumferentially, the shroud disposed radially outside of the hub, the shroud and hub collectively forming an annular gas path therebetween, the variable guide vane assembly comprising:

a plurality of vanes extending between the shroud and the hub, and the vanes are circumferentially disposed and spaced apart from one another, wherein each vane includes:

an inner radial end disposed adjacent the hub;

an outer radial end disposed adjacent the shroud;

an inner radial post;

an outer radial post; and a rotational axis extending through the inner radial post and the outer radial post;

wherein each vane is pivotally mounted to rotate about its rotational axis; and a plurality of first rotational-translational mechanisms (RT mechanism), and a plurality of second RT mechanisms, and wherein for each said vane:

a said first RT mechanism of the plurality of first RT mechanisms includes a first collar and a first pin, wherein the first collar remains static relative to the vane during rotation of the vane, and the first collar has a first inner bore configured to receive the outer radial post, wherein a first said ramp slot extends circumferentially in the first collar and the first pin is attached to the outer radial post and is received within the first ramp slot; and a said second RT mechanism of the plurality of second RT mechanisms includes a second collar and a second pin, wherein the second collar remains static relative to the vane during rotation of the vane, and the second collar has a second inner bore configured to receive the inner radial post, wherein a second said ramp slot extends circumferentially in the second collar and the second pin is attached to the inner radial post and is received within the second ramp slot.

9. A variable guide vane assembly for a gas turbine engine stator having a shroud and a hub, the shroud and hub extending circumferentially, the shroud disposed radially outside of the hub, the shroud and hub collectively forming an annular gas path therebetween, the variable guide vane assembly comprising:

a plurality of vanes extending between the shroud and the hub, and the vanes are circumferentially disposed and spaced apart from one another, wherein each vane includes:

an inner radial end disposed adjacent the hub;

an outer radial end disposed adjacent the shroud;

an inner radial post;

an outer radial post; and a rotational axis extending through the inner radial post and the outer radial post;

wherein each vane is pivotally mounted to rotate about its rotational axis; and a plurality of rotational—translational mechanisms (RT mechanism), each respective RT mechanism in communication with a respective said vane, and each respective RT mechanism including a collar that remains static relative to the vane during rotation of the vane, the collar having an inner bore receiving the inner radial post of the respective vane, the collar including a ramp slot that extends circumferentially between a first lengthwise end and a second lengthwise end, the collar is in communication with the hub, the RT mechanism including a pin that extends outwardly from the inner radial post and is disposed in the ramp slot, and the RT mechanism is configured such that rotation of the vane relative to the first collar causes the pin to travel within the ramp slot and the respective said vane to translate linearly between the shroud and the hub.

* * * * *